US012789808B2

(12) United States Patent
Miyagi et al.

(10) Patent No.: US 12,789,808 B2
(45) Date of Patent: Nov. 10, 2026

(54) VEHICLE DRIVE DEVICE

(71) Applicant: AISIN CORPORATION, Kariya (JP)

(72) Inventors: Masaya Miyagi, Kariya (JP); Yuji Kajiyama, Kariya (JP)

(73) Assignee: AISIN CORPORATION, Kariya (JP)

( * ) Notice: Subject to any disclaimer, the term of this patent is extended or adjusted under 35 U.S.C. 154(b) by 238 days.

(21) Appl. No.: 18/273,671

(22) PCT Filed: Feb. 16, 2022

(86) PCT No.: PCT/JP2022/006230
§ 371 (c)(1),
(2) Date: Jul. 21, 2023

(87) PCT Pub. No.: WO2022/209384
PCT Pub. Date: Oct. 6, 2022

(65) Prior Publication Data

US 2024/0083434 A1 Mar. 14, 2024

(30) Foreign Application Priority Data

Mar. 30, 2021 (JP) ................................ 2021-058719

(51) Int. Cl.
*B60W 30/18* (2012.01)
*B60K 6/387* (2007.10)
(Continued)

(52) U.S. Cl.
CPC ...... *B60W 30/18027* (2013.01); *B60W 10/02* (2013.01); *B60W 10/08* (2013.01);
(Continued)

(58) Field of Classification Search
None
See application file for complete search history.

(56) References Cited

U.S. PATENT DOCUMENTS

2016/0214610 A1* 7/2016 Kotsuji ................. B60W 30/18
2019/0193720 A1* 6/2019 Komuro ................. B60K 6/543

FOREIGN PATENT DOCUMENTS

JP 2004-036670 A 2/2004
JP 2010-266026 A 11/2010
(Continued)

OTHER PUBLICATIONS

International Search Report for PCT/JP2022/006230 dated Apr. 26, 2022 [PCT/ISA/210].

*Primary Examiner* — Lail A Kleinman
(74) *Attorney, Agent, or Firm* — Sughrue Mion, PLLC

(57) ABSTRACT

A vehicle drive device includes: a rotating electrical machine; a speed change mechanism including an input member and an output member drivingly connected to wheels, and configured to change a speed ratio between the input member and the output member; a friction engagement device interposed between the rotating electrical machine and the input member and including a friction engagement element configured to connect and disconnect power transmission between the rotating electrical machine and the input member as an engagement pressure is supplied and discharged; and a control device that controls the rotating electrical machine and the friction engagement device. The control device performs learning control when the input member is held stationary and non-rotatable, the learning control being control in which the control device drives the rotating electrical machine while controlling the engagement pressure to an engagement start pressure at which the friction engagement element starts to engage, and learns the engagement start pressure based on a change in driving state of the rotating electrical machine at the time the friction engagement element starts to engage.

5 Claims, 6 Drawing Sheets

(51) Int. Cl.
*B60W 10/02* (2006.01)
*B60W 10/08* (2006.01)
*B60W 20/40* (2016.01)

(52) U.S. Cl.
CPC .............. *B60K 6/387* (2013.01); *B60W 20/40* (2013.01); *B60W 2510/1015* (2013.01); *B60W 2520/04* (2013.01); *B60W 2710/023* (2013.01); *B60W 2710/08* (2013.01); *B60W 2710/30* (2013.01); *B60Y 2200/92* (2013.01)

(56) References Cited

FOREIGN PATENT DOCUMENTS

JP 2014-213704 A 11/2014
JP 2015-055337 A 3/2015

* cited by examiner

VEHICLE DRIVE DEVICE

CROSS REFERENCE TO RELATED APPLICATIONS

This application is a National Stage of International Application No. PCT/JP2022/006230 filed Feb. 16, 2022, claiming priority based Japanese Patent Application No. 2021-058719, the entire contents of which are incorporated in their entirety.

TECHNICAL FIELD

This technique relates to vehicle drive devices that are mounted on vehicles such as automobiles.

BACKGROUND ART

In recent years, a so-called single-motor parallel hybrid vehicle has been developed that includes an engine, a motor generator (hereinafter simply referred to as "motor"), an engine connection clutch interposed between the engine and the motor, and a speed change mechanism interposed between the motor and front wheels (see Patent Document 1). In this hybrid vehicle, the following control is performed in order to learn an engagement start pressure of the engine connection clutch.

First, it is assumed that the vehicle is in EV mode and at a complete stop with the speed change mechanism in P range or N range. In this state, the rotational speed of the motor is controlled to rotate the motor within such a motor torque range that does not rotate the engine, thereby generating differential rotation in the engine connection clutch. Then, the engine connection clutch is gradually changed from a disengaged state to an engaged state, and the engagement start pressure of the engine connection clutch is learned based on the amount of change in torque of the motor at the time the engine connection clutch is engaged. The learning control is performed in this manner.

RELATED ART DOCUMENTS

Patent Documents

Patent Document 1: Japanese Unexamined Patent Application Publication No. 2014-213704 (JP 2014-213704 A)

SUMMARY OF THE DISCLOSURE

Problem to be Solved by Various Aspects of the Disclosure

In recent years, a single-motor parallel hybrid vehicle has been developed that includes between the motor and the speed change mechanism a starting clutch that is, for example, a friction engagement element. In this case, it is desirable to also learn the engagement start pressure of the starting clutch by a method similar to that for the engine connection clutch.

In the hybrid vehicle described in Patent Document 1, however, the learning control for the engagement start pressure of the engine connection clutch is performed when the hybrid vehicle is at a complete stop with the speed change mechanism in P range or N range. Therefore, if this learning control is applied to the starting clutch, an input member of the speed change mechanism may rotate due to drag torque generated by the starting clutch when the motor is rotating during the learning control. If the input member rotates due to drag, it becomes difficult to obtain a change in torque of the motor at the time the starting clutch starts to engage, and it may not be possible to learn the engagement start pressure of the starting clutch.

It is therefore an object of the present disclosure to provide a vehicle drive device capable of learning an engagement start pressure of a starting clutch.

Means for Solving the Problem

A vehicle drive device of the present disclosure includes: a rotating electrical machine; a speed change mechanism including an input member and an output member drivingly connected to wheels, and configured to change a speed ratio between the input member and the output member; a friction engagement device interposed between the rotating electrical machine and the input member and including a friction engagement element configured to connect and disconnect power transmission between the rotating electrical machine and the input member as an engagement pressure is supplied and discharged; and a control device that controls the rotating electrical machine and the friction engagement device. The control device performs learning control when the input member is held stationary and non-rotatable, the learning control being control in which the control device drives the rotating electrical machine while controlling the engagement pressure to an engagement start pressure at which the friction engagement element starts to engage, and learns the engagement start pressure based on a change in driving state of the rotating electrical machine at a time the friction engagement element starts to engage.

Effects of the Disclosure

According to this vehicle drive device, it is possible to learn the engagement start pressure of the starting clutch.

DESCRIPTION OF EMBODIMENTS

Hereinafter, an embodiment will be described with reference to FIGS. 1 to 6. First, a schematic configuration of a hybrid drive device 1 that is an example of the vehicle drive device will be described with reference to FIG. 1. In the present application, "drivingly connected" refers to a state in which rotating elements are connected such that a driving force can be transmitted therebetween, and is used as a concept including a state in which the rotating elements are connected so as to rotate together or a state in which the rotating elements are connected via a clutch etc. such that a driving force can be transmitted therebetween via the clutch etc.

Figure 1:
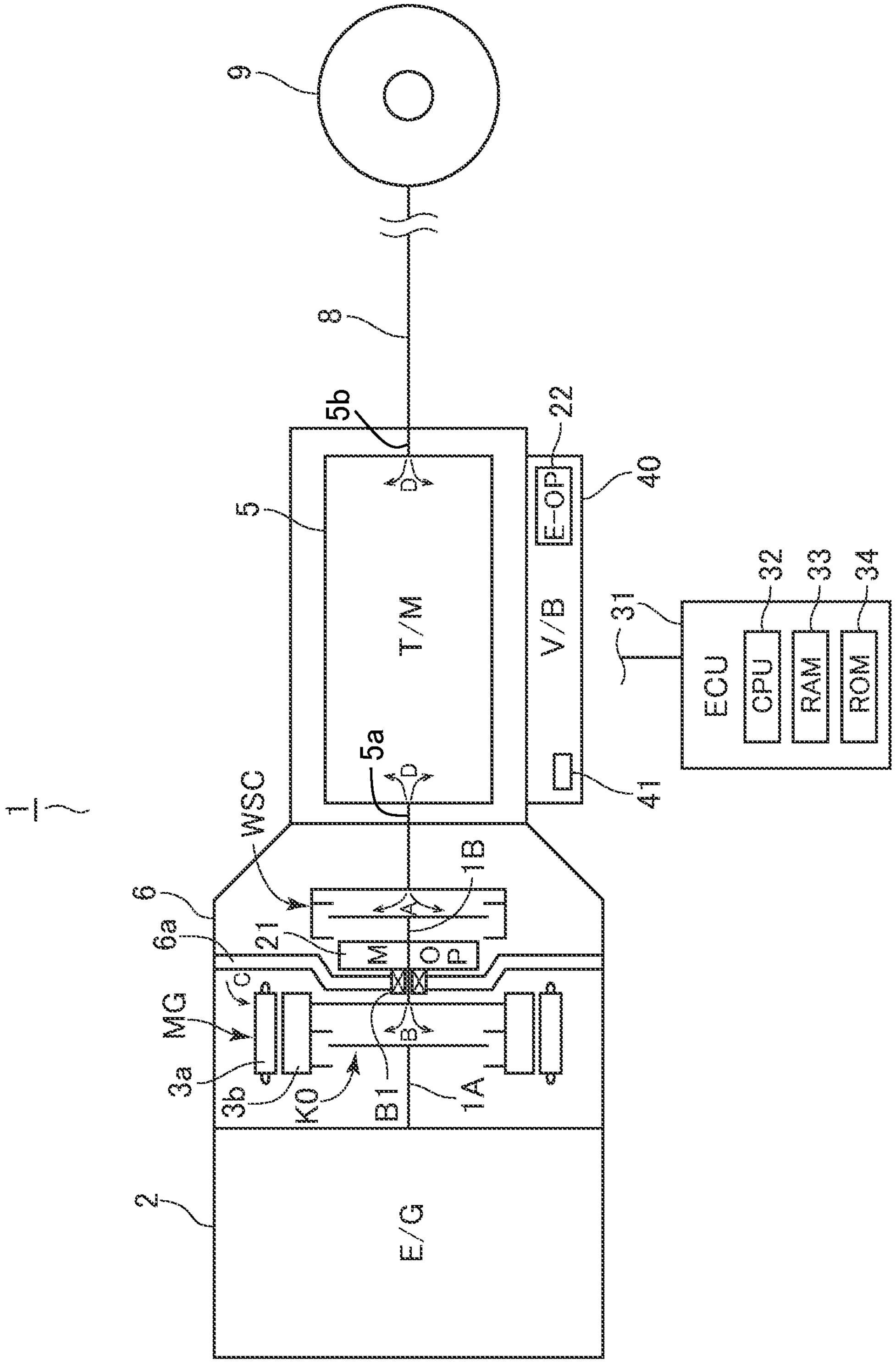
FIG. 1 is a block diagram showing a vehicle drive device according to an embodiment.

As shown in FIG. 1, the hybrid drive device 1 is suitable for use in, for example, front engine, rear-wheel-drive (FR) vehicles, and an input shaft 1A is drivingly connected to an engine 2 serving as a driving source. The hybrid drive device 1 includes: a rotating electrical machine (motor generator) MG serving as a driving source having a stator 3*a* and a rotor 3*b* inside a case 6; a speed change mechanism 5 provided on a power transmission path between the engine 2 and the motor MG and wheels 9; a clutch K0 disposed between the engine 2 and the motor generator (hereinafter simply referred to as motor) MG on the power transmission path and serving as an engine connection clutch capable of disconnecting the engine 2; a starting clutch WSC disposed between the motor MG and the speed change mechanism 5 on the power transmission path, configured to connect and disconnect power transmission between the engine 2 and the motor MG (i.e., the driving source) and the speed change mechanism, and being particularly an example of a friction engagement device that is engaged when a vehicle starts to move; and a control device (ECU) 31. The hybrid drive device 1 is not limited to being applied to the FR vehicles, and may be applied to front-engine, front-wheel-drive (FF) vehicles.

A mechanical oil pump 21 that is drivingly coupled to a rotating shaft 1B drivingly connected to the motor MG and is also drivingly connected to the engine 2 when the clutch K0 is engaged, and is thus driven by either or both of the motor MG and the engine 2 is provided between the motor MG and the starting clutch WSC in the axial direction. The rotating shaft 1B is supported by a bearing B1 so as to be rotatable with respect to a support wall 6*a* supported by the case 6. Although not shown in the figure, a damper device etc. that transmits rotation of the engine 2 while dampening pulsation of the engine 2 is usually provided between the engine 2 and the clutch K0.

The speed change mechanism (T/M) 5 has an input shaft 5*a* that is an example of the input member and an output shaft 5*b* that is an example of the output member drivingly connected to the wheels 9, and can change the speed ratio between the input shaft 5*a* and the output shaft 5*b*. The speed change mechanism 5 is a speed change mechanism that can change a transmission path based on the engagement states of a plurality of friction engagement elements (clutches and brakes) to attain six forward speeds and a reverse speed. In the present embodiment, the speed change mechanism 5 has, as shift ranges, travel ranges, namely a drive range (D range) and a reverse range (R range), a parking range, and a neutral range. The input shaft 5*a* of the speed change mechanism 5 is drivingly connected to the starting clutch WSC via a connecting member 101 (see FIG. 2). A propeller shaft 8 is drivingly connected to the output shaft 5*b* of the speed change mechanism 5, and rotation output to the propeller shaft 8 is transmitted to the right and left wheels 9 via a differential unit etc.

The speed change mechanism 5 may be a stepped speed change mechanism that attains, for example, three to five forward speeds or seven or more forward speeds, or may be a continuously variable speed change mechanism such as a belt type continuously variable transmission or a toroidal type continuously variable transmission. That is, the speed change mechanism 5 may be any type of speed change mechanism.

The control device 31 includes a CPU 32, a RAM 33 that temporarily stores data, and a ROM 34 that stores processing programs. The control device 31 outputs, from an output port, various signals such as a control signal for each solenoid valve of a hydraulic control device 40, a control signal for a control device (not shown) of the engine 2, and a control signal for the motor MG. The control device 31 is configured so that detection signals from various sensors such as a hydraulic switch 62 (see FIG. 3) described later are input to the control device 31 from an input port of the control device 31. For example, the control device 31 is connected to a motor rotational speed sensor 71, not shown, for detecting the rotational speed of the rotating shaft 1B of the motor MG, that is, the motor rotational speed. The control device 31 is also connected to an input rotational speed sensor, not shown, for detecting the rotational speed of the input shaft 5*a* of the speed change mechanism 5, and an output rotational speed sensor, not shown, for detecting the rotational speed of the output shaft 5*b* of the speed change mechanism 5, that is, the output rotational speed. The control device 31 can detect the vehicle speed using the detection value from the output rotational speed sensor.

The control device 31 controls the engine rotational speed and the engine torque as desired by sending a command to the engine 2 via an engine control device, not shown. The control device 31 controls the friction engagement state of the clutch K0 as desired by sending a command to the hydraulic control device 40 to regulate and control a clutch oil pressure. That is, the control device 31 controls engagement and disengagement of the clutch K0 by an electrical command. The control device 31 performs power control on the motor MG to control the motor rotational speed by rotational speed control and control the motor torque by torque control as desired. The control device 31 controls the friction engagement state of the starting clutch WSC as desired by sending a command to the hydraulic control device 40 to regulate and control a clutch oil pressure. That is, the control device 31 controls engagement and disengagement of the starting clutch WSC by an electrical command. The control device 31 performs control so as to control shifting (change the speed ratio) by selecting and determining a shift speed based on, for example, the vehicle speed and the accelerator operation amount and sending a command to the hydraulic control device 40 to hydraulically control each friction engagement element (clutches and brakes).

In such a hybrid drive device 1 as described above, the clutch K0, the motor MG, the starting clutch WSC, and the speed change mechanism 5 are sequentially arranged from the engine 2 side toward the wheels 9. When causing the vehicle to travel by driving both the engine 2 and the motor MG or by driving the engine 2, the control device 31 controls the hydraulic control device 40 to engage the clutch K0 and the starting clutch WSC. When causing the vehicle to travel in EV mode in which the vehicle travels only by the driving force of the motor MG, the clutch K0 is disengaged to disconnect the transmission path between the engine 2 and the wheels 9.

The hybrid drive device 1 includes the mechanical oil pump (MOP) 21 and an electric oil pump (E-OP) 22 as oil pressure sources for generating an oil pressure (source pressure) to be used in the hydraulic control device 40. The mechanical oil pump 21 is provided such that a drive gear is drivingly connected to the rotating shaft 1B. That is, the mechanical oil pump 21 is driven to rotate in conjunction with the engine 2 and the motor MG when the clutch K0 is engaged, and is driven to rotate in conjunction with the motor MG when the clutch K0 is disengaged. The electric oil pump 22 is configured to be electrically driven by an electric motor, not shown, independently of the mechanical oil pump 21, and is controlled to be driven and stopped based on an electronic command from the control device 31. An oil temperature sensor 41 for detecting the oil temperature is provided inside the hydraulic control device 40. The oil temperature sensor 41 is configured to output the detected oil temperature to the control device 31. The electric motor, not shown, for driving the electric oil pump 22 is used only to drive the electric oil pump 22. This electric motor is completely isolated from the transmission path between the engine 2 and the wheels 9, and does not transmit the driving force to the wheels 9.

Figure 2:
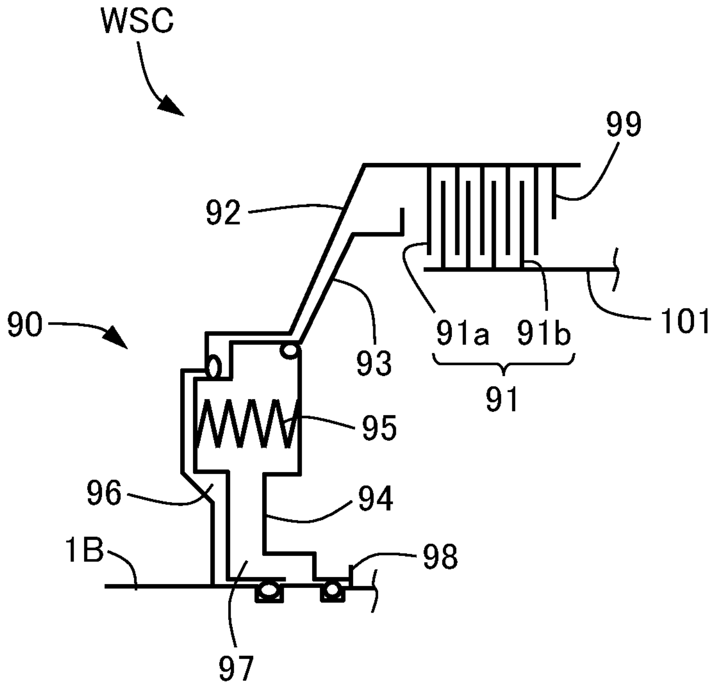
FIG. 2 is a skeleton diagram showing a hydraulic servo of a starting clutch according to the embodiment.

The starting clutch WSC is an example of the friction engagement device including a friction engagement element configured to connect and disconnect power transmission between the motor MG and the input shaft 5*a* as an engagement pressure is supplied and discharged. As shown in FIG. 2, the starting clutch WSC has friction plates 91 that are an example of the friction engagement element, and a hydraulic servo 90 that pushes and drives the friction plates 91 so that the friction plates 91 can be engaged. The friction plates 91 include a plurality of outer friction plates 91*a* and a plurality of inner friction plates 91*b*. The hydraulic servo 90 has a cylinder member 92, a piston member 93, a return plate 94 that is an example of the opposing member, and a return spring 95. These components form a hydraulic oil chamber 96 and a cancel oil chamber 97 that is an example of the opposing oil chamber. The inner peripheral end of the cylinder member 92 is fixed to the rotating shaft 1B of the motor MG. That is, the hydraulic servo 90 is located on the rotating shaft 1B, and is disposed so as to rotate with the rotating shaft 1B. The outer peripheral end of the cylinder member 92 extends in the axial direction to the outer peripheries of the friction plates 91, and the inner periphery of the outer peripheral end is spline-engaged with the outer friction plates 91*a*. A snap ring 99 is fitted in the distal end of the cylinder member 92 to restrict movement of the friction plates 91 to the right in the figure.

A portion of the cylinder member 92 that faces the piston member 93 on the right side of the cylinder member 92 in the figure is formed as a cylinder that forms the hydraulic oil chamber 96. The piston member 93 is axially slidably fitted in the cylinder member 92, and the return plate 94 is mounted so as to be positioned by a snap ring 98. The piston member 93 is axially movably disposed so as to face the right side of the cylinder member 92 in the figure, and forms the oil-tight hydraulic oil chamber 96 between the piston member 93 and the cylinder member 92. The piston member 93 is disposed such that its outer periphery faces the friction plate 91 in the axial direction. That is, the piston member 93 is disposed so as to be axially movable with respect to the cylinder member 92, forms the hydraulic oil chamber 96 between the piston member 93 and the cylinder member 92, and is configured to push the friction plates 91 by the oil pressure supplied to the hydraulic oil chamber 96. The return plate 94 forms, between the return plate 94 and the piston member 93, the oil-tight cancel oil chamber 97 in which the return spring 95 is mounted in a contracted state. The return plate 94 is always biased to the right in the figure by the biasing force of the return spring 95. That is, the return plate 94 is made stationary with respect to the cylinder member 92. In other words, the return plate 94 is disposed on one side in the axial direction with respect to the piston member 93 so as to face the piston member 93, and forms the cancel oil chamber 97 that cancels the centrifugal oil pressure generated in the hydraulic oil chamber 96.

In the starting clutch WSC configured as described above, when a hydraulic oil pressure is supplied from the hydraulic control device 40 to the hydraulic oil chamber 96 through an oil passage, not shown, the piston member 93 is pushed and driven to the right in the figure against the biasing force of the return spring 95, so that the friction plates 91 are engaged and the cylinder member 92 and the rotating shaft 1B are drivingly connected to the input shaft 5*a* of the speed change mechanism 5 in the rotational direction. On the other hand, when the hydraulic oil pressure is discharged from the hydraulic oil chamber 96, the centrifugal oil pressure in the hydraulic oil chamber 96 is canceled by the oil in the cancel oil chamber 97, and the piston member 93 is moved rearward by the biasing force of the return spring 95, so that the friction plates 91 are disengaged.

The engagement/disengagement states of the starting clutch WSC and the clutch K0 are controlled by the magnitude of the oil pressure, and are classified into the "disengaged state" in which the friction plates 91 are separated from each other, the "slip-engaged state" in which torque capacity to be transmitted is generated while slipping, and the "fully engaged state" in which the oil pressure is increased as much as possible so that the friction plates 91 are fastened together. The "slip-engaged state" can be defined as a period from when the piston member 93 strokes from the disengaged state to a stroke end where the piston member 93 comes into contact with the friction plate 91 until when the rotational speeds of the friction plates 91 are synchronized with each other. The "disengaged state" can be defined as a state in which the piston member 93 is located before the stroke end and is separated from the friction plate 91. The engagement pressure at which the piston member 93 strokes from the disengaged state to the stroke end where the piston member 93 comes into contact with the friction plate 91 is defined as an engagement start pressure (stroke end pressure).

Figure 3:
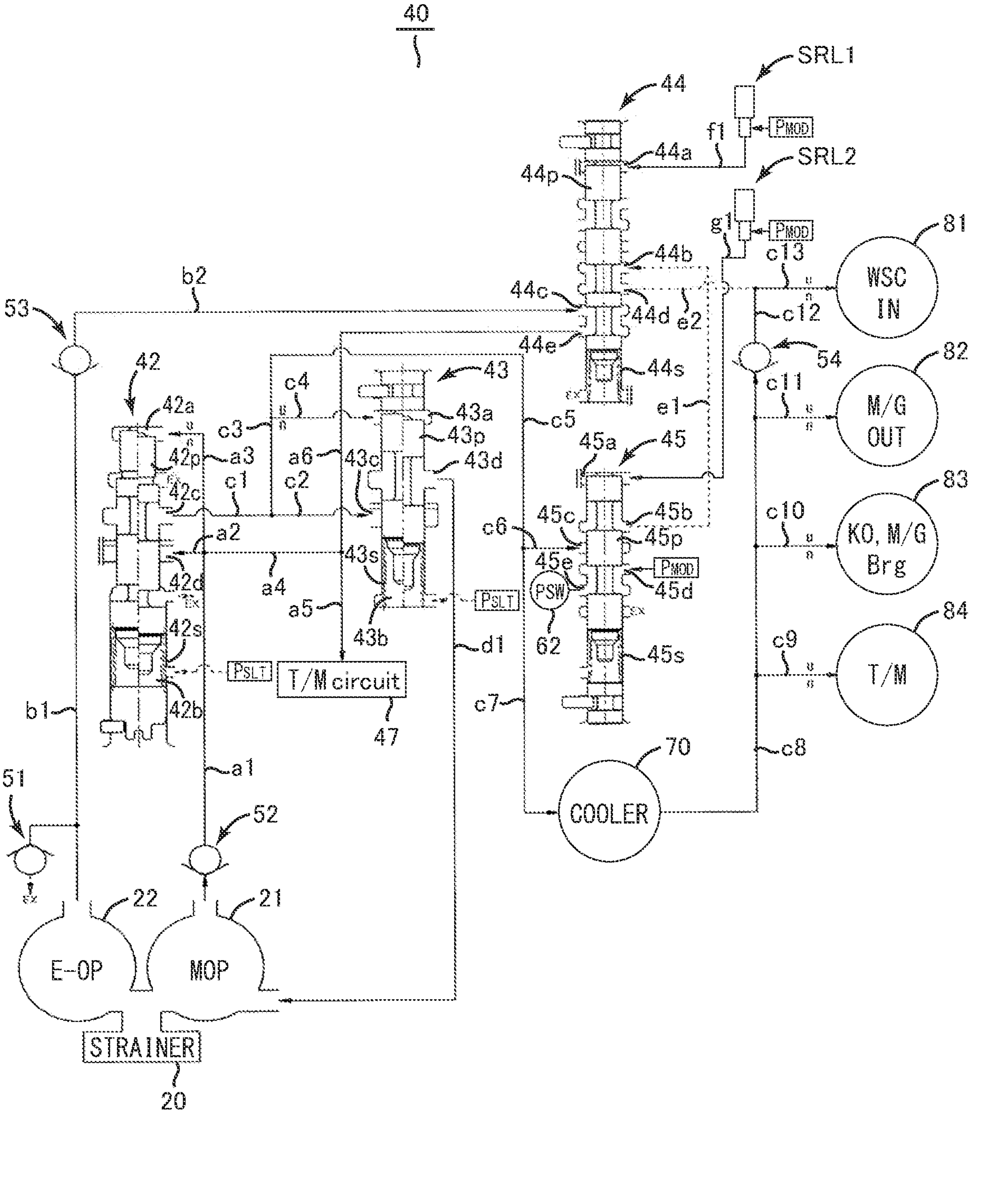
FIG. 3 is a hydraulic circuit diagram showing part of a hydraulic control device in a low lubrication state according to the embodiment.
Figure 4:
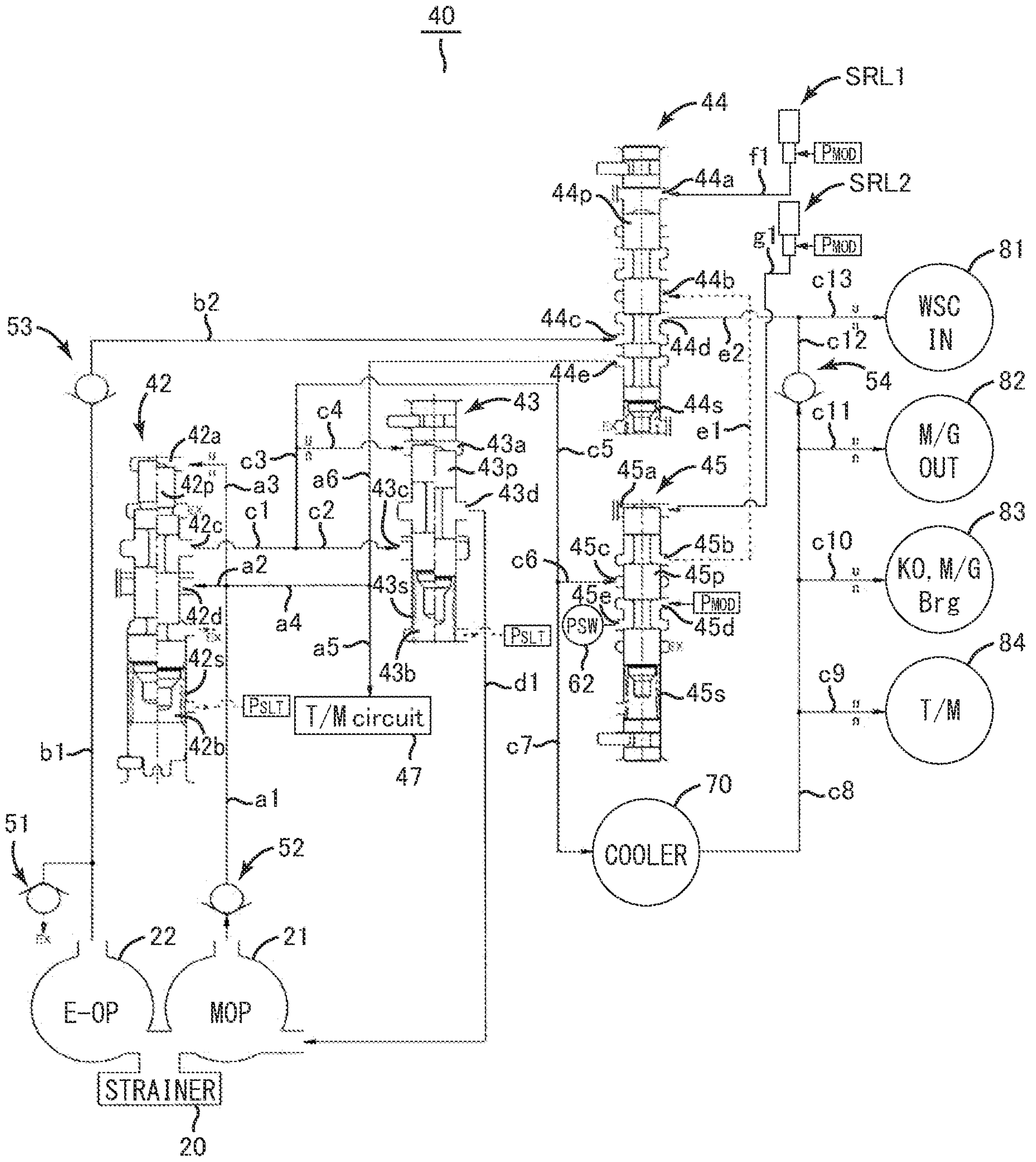
FIG. 4 is a hydraulic circuit diagram showing part of the hydraulic control device in a high lubrication state according to the embodiment.

Next, the hydraulic control device 40 according to the present embodiment will be described with reference to FIGS. 3 and 4. FIGS. 3 and 4 are diagrams showing the hydraulic control device 40, where FIG. 3 shows a normal state (low lubrication state) and FIG. 4 shows a high lubrication state.

As shown in FIG. 3, the hydraulic control device 40 roughly includes a primary regulator valve 42, a secondary regulator valve 43, a solenoid valve SRL1, a solenoid valve SRL2, a first lubrication switch valve 44, a second lubrication switch valve 45, etc. The hydraulic control device 40 is connected to the mechanical oil pump 21 and the electric oil pump 22 that serve as the oil pressure sources, and is thus supplied with an oil pressure. The hydraulic control device 40 is also connected to a cooler 70 so as to communicate with the cooler 70. The hydraulic control device 40 is also connected to a first lubrication circuit 81 for supplying lubricating oil toward the starting clutch WSC as shown by arrows A in FIG. 1, a second lubrication circuit 82 for supplying lubricating oil toward the outer periphery of the motor MG as shown by arrows C in FIG. 1, a third lubrication circuit 83 for supplying lubricating oil toward the clutch K0, the inner periphery of the motor MG, and the bearing B1 as shown by arrows B in FIG. 1, and a fourth lubrication circuit 84 for supplying lubricating oil toward each part of the speed change mechanism 5 as shown by arrows D in FIG. 1 such that the hydraulic control device 40 communicate with these lubrication circuits.

Specifically, when the electric oil pump 22 is driven by a command from the control device 31, the electric oil pump 22 sucks oil from a strainer 20, generates an oil pressure $P_{EOP}$ in oil passages b1, b2, and supplies the oil pressure $P_{EOP}$ to an input port 44*c* of the first lubrication switch valve 44 described later. When a spool 44*p* of the first lubrication switch valve 44 is in an upper position in the figure, the electric oil pump 22 communicates with a pressure regulation port 42*d* of the primary regulator valve 42 through an output port 44*e* via oil passages a6, a4, and a2. That is, the oil pressure $P_{EOP}$ generated by the electric oil pump 22 is supplied to a line pressure circuit.

A check ball 53 interposed between the oil passage b1 and the oil passage b2 is disposed so as to prevent a line pressure PL regulated by the primary regulator valve 42 from becoming higher than the oil pressure $P_{EOP}$ output from the electric oil pump 22 and flowing backward to the electric oil pump 22. A check ball 51 connected to the oil passage b1 is closed by a spring, not shown. When the oil pressure in the oil passage b1 becomes equal to or higher than a predetermined pressure, the check ball 51 releases the oil pressure in the oil passage b1 to prevent a high pressure from being applied to the electric oil pump 22, and thus protect the electric oil pump 22.

The mechanical oil pump 21 driven by the engine 2 or the motor MG as described above sucks oil from the strainer 20 and opens a check ball 52 to generate an oil pressure P MOP in oil passages a1, a2, a3, a4, a5, and a6 that serve as the line pressure circuit. The oil pressure $P_{MOP}$ is regulated to the line pressure PL by the primary regulator valve 42 that will described later in detail. The check ball 52 prevents the oil pressure $P_{EOP}$ from the electric oil pump 22 from flowing backward to the mechanical oil pump 21 when the mechanical oil pump 21 is stopped such as when the vehicle is at a complete stop during traveling in EV mode.

The primary regulator valve 42 includes a spool 42*p*, a spring 42*s* that biases the spool 42*p* toward one side, a feedback oil chamber 42*a*, an hydraulic oil chamber 42*b*, a discharge port 42*c*, and the pressure regulation port 42*d*. The spool 42*p* of the primary regulator valve 42 adjusts the amount of communication (amount of opening) between the pressure regulation port 42*d* and the discharge port 42*c* according to: for example, a control pressure $P_{SLT}$ output from a linear solenoid valve SLT, not shown, based on a throttle valve opening degree etc.; the biasing force of the spring 42*s*; and a feedback pressure fed back to the feedback oil chamber 42*a* via the oil passage a3. The spool 42*p* of the primary regulator valve 42 thus regulates the oil pressure in the oil passages a1 to a6 connected to the pressure regulation port 42*d* to the line pressure PL.

The line pressure PL thus regulated by the primary regulator valve 42 is supplied via the oil passage a5 to an engagement circuit (T/M circuit) 47 serving as an engagement control hydraulic circuit that controls supply of engagement pressures to hydraulic servos of the clutches (including the clutch K0 and the starting clutch WSC) and brakes of the speed change mechanism 5, and is regulated and controlled by solenoid valves etc. that are electronically controlled by the control device 31. The engagement pressures are thus supplied to the hydraulic servos, so that each of the clutches and the brakes is controlled to the disengaged state, the slip-engaged state, or the fully engaged state as desired.

The line pressure PL is also supplied to a modulator valve, not shown, to output a modulator pressure $P_{MOD}$ obtained by reducing the line pressure PL to a certain pressure or less.

The oil pressure discharged from the discharge port 42*c* of the primary regulator valve 42 is supplied to oil passages c1, c2, c3, c4, c5, c6, c7, c8, c9, c10, c11, c12, and c13. In particular, this oil pressure is supplied to the secondary regulator valve 43 through the oil passage c4 and is thus regulated to a secondary pressure $P_{SEC}$.

The secondary regulator valve 43 has substantially the same configuration as that of the primary regulator valve 42, and includes a spool 43*p*, a spring 43*s* that biases the spool 43*p* toward one side, a feedback oil chamber 43*a*, a hydraulic oil chamber 43*b*, a pressure regulation port 43*c*, and a discharge port 43*d*. The spool 43*p* of the secondary regulator valve 43 adjusts the amount of communication (amount of opening) between the pressure regulation port 43*c* and the discharge port 43*d* according to the control pressure $P_{SLT}$, the biasing force of the spring 43*s*, and a feedback pressure fed back to the feedback oil chamber 43*a* via the oil passage c4. The spool 43*p* of the secondary regulator valve 43 thus regulates the oil pressure in the oil passages c1 to c13 connected to the pressure regulation port 43*c* to the secondary pressure $P_{SEC}$.

The secondary pressure $P_{SEC}$ thus regulated by the pressure regulation port 43*c* of the secondary regulator valve 43 is supplied, as a lubricating pressure, to an input port 45*c* of the second lubrication switch valve 45 described later through the oil passage c6. The secondary pressure $P_{SEC}$ is also supplied to the cooler 70 through the oil passage c7, cooled by the cooler 70, and then supplied to c8. This secondary pressure $P_{SEC}$ is supplied to the fourth lubrication circuit 84 via the oil passage c9, to the third lubrication circuit 83 via the oil passage c10, to the second lubrication circuit 82 via the oil passage c11, and to the first lubrication circuit 81 via the oil passages c12, c13.

A check ball 54 that is an example of a check valve blocks backflow from the oil passage c12 to the secondary regulator valve 43 (from downstream to upstream) when the first lubrication switch valve 44 is switched and the oil pressure $P_{EOP}$ of the electric oil pump 22 is supplied to oil passages e2, c13 as will be described later in detail. The check ball 54 is disposed downstream of the second lubrication circuit 82 to the fourth lubrication circuit 84 in the oil passages c1 to c13 for the lubricating oil flowing from the secondary regulator valve 43 toward the first lubrication circuit 81. The check ball 54 thus also prevents the oil pressure P EOP of the electric oil pump 22 from flowing to the second to fourth lubrication circuits 82 to 84 when supplied to the oil passages e2, c13. The oil pressure discharged from the discharge port 43*d* of the secondary regulator valve 43 is returned as an excess pressure to a suction port (not shown) of the mechanical oil pump 21 via an oil passage dl. This reduces a drive load on the mechanical oil pump 21 and drive loads on the engine 2 and the motor MG to improve the fuel efficiency of the vehicle.

The solenoid valve SRL1 is of, for example, a normally closed type and is configured to output a signal pressure $P_{SL1}$. Specifically, the modulator pressure $P_{MOD}$ described above is input to the solenoid valve SRL1, and the solenoid valve SRL1 outputs the signal pressure $P_{SRL1}$ to a hydraulic oil chamber 44*a* of the first lubrication switch valve 44 described later via an oil passage f1 when controlled to be ON by a command from the control device 31, and does not output the signal pressure $P_{SRL1}$ when controlled to be OFF by a command from the control device 31.

Similarly, the solenoid valve SRL2 is of, for example, a normally closed type and is configured to output a signal pressure $P_{SL2}$. Specifically, the modulator pressure $P_{MOD}$ described above is input to the solenoid valve SRL2, and the solenoid valve SRL2 outputs the signal pressure $P_{SRL2}$ to a hydraulic oil chamber 45*a* of the second lubrication switch valve 45 described later via an oil passage g1 when controlled to be ON by a command from the control device 31, and does not output the signal pressure $P_{SRL2}$ when controlled to be OFF by a command from the control device 31.

The first lubrication switch valve 44 includes the spool 44*p*, a spring 44*s* that biases the spool 44*p* toward one side, the hydraulic oil chamber 44*a*, an input port 44*b*, an output port 44*d*, the input port 44*c*, and the output port 44*e*. In the first lubrication switch valve 44, when the spool 44*p* is biased to the upper position in the figure (first state) by the biasing force of the spring 44*s*, the input port 44*b* and the output port 44*d* communicate with each other and the input port 44*c* and the output port 44*e* communicate with each other. When the signal pressure $P_{SRL1}$ is input through the oil passage f1 and the spool 44*p* is switched to a lower position in the figure (second state) against the biasing force of the spring 44*s*, the input port 44*c* and the output port 44*d* communicate with each other and the input port 44*b* and the output port 44*e* are blocked.

The second lubrication switch valve 45 includes a spool 45*p*, a spring 45*s* that biases the spool 45*p* toward one side, the hydraulic oil chamber 45*a*, an output port 45*b*, the input port 45*c*, an input port 45*d*, and an output port 45*e*. In the second lubrication switch valve 45, when the spool 45*p* is biased to an upper position in the figure (disconnected state) by the biasing force of the spring 45*s*, the input port 45*d* and the output port 45*e* communicate with each other and the input port 45*c* is blocked. When the signal pressure $P_{SRL2}$ is input through the oil passage g1 and the spool 45*p* is switched to a lower position in the figure (communicating state) against the biasing force of the spring 45*s*, the input port 45*c* and the output port 45*b* communicate with each other and the input port 45*d* is blocked.

The modulator pressure $P_{MOD}$ is input to the input port 45*d*. The hydraulic switch 62 that electrically outputs an ON signal to the control device 31 when an oil pressure equal to or higher than a predetermined pressure is input is connected to the output port 45*e*. Therefore, the hydraulic switch 62 receives the modulator pressure $P_{MOD}$ when the spool 45*p* is in the upper position in the figure, and detects whether the second lubrication switch valve 45 is in the lower position in the figure. Particularly when the hydraulic switch 62 does not output the ON signal while the solenoid valve SRL2 is controlled to be OFF, the control device 31 detects an abnormal state in which the spool 45*p* of the second lubrication switch valve 45 sticks to the lower position in the figure.

Next, the operation of the hydraulic control device 40 will be described. When the oil temperature detected by the oil temperature sensor 41 is normal temperature and the starting clutch WSC is in the engaged state or the disengaged state (not in the slip state), this state is considered to be a normal state. Both the solenoid valve SRL1 and the solenoid valve SRL2 are therefore controlled to be OFF, so that the first lubrication switch valve 44 is switched to the upper position in the figure and the second lubrication switch valve 45 is also switched to the upper position in the figure, resulting in the state shown in FIG. 3.

In the normal state, when the engine 2 or the motor MG is driven, the mechanical oil pump 21 generates the oil pressure P MOP toward the oil passage a1. When the electric oil pump 22 is controlled to be ON, the electric oil pump 22 generates the oil pressure $P_{EOP}$ toward the oil passage b1, and the electric oil pump 22 communicates with the pressure regulation port 42*d* of the primary regulator valve 42 via the oil passages b1, b2, the input port 44*c* and the output port 44*e* of the first lubrication switch valve 44, and the oil passage a6. That is, the line pressure PL is regulated by the primary regulator valve 42 and the secondary pressure $P_{SEC}$ is regulated by the secondary regulator valve 43, based on either or both of the oil pressure $P_{MOP}$ and the oil pressure $P_{EOP}$.

When the secondary pressure $P_{SEC}$ is supplied to the oil passages c1 to c13 as a lubricating pressure as described above, the lubricating oil that flows based on the lubricating pressure is supplied to the first lubrication circuit 81, the second lubrication circuit 82, the third lubrication circuit 83, and the fourth lubrication circuit 84 through the cooler 70 because the input port 45*c* and the output port 45*b* of the second lubrication switch valve 45 are disconnected. This state can be said to be a low-flow rate state because the amount of lubricating oil that is supplied to the starting clutch WSC is smaller than that in a high-flow rate state described later.

Next, an example in which the oil temperature is normal temperature and the starting clutch WSC is slip-engaged so that the vehicle starts to move will be described with reference to FIG. 4. When the oil temperature detected by the oil temperature sensor 41 is normal temperature and the control device 31 determines that the vehicle is going to start to move and supplies the engagement pressure to the hydraulic servo of the starting clutch WSC to engage the starting clutch WSC, the solenoid valve SRL2 is controlled to be OFF and the solenoid valve SRL1 is controlled to be ON, so that the spool 44*p* of the first lubrication switch valve 44 is switched to the lower position in the figure by the signal pressure $P_{SRL1}$. The mechanical oil pump 21 has been driven at this time because the vehicle starts to move by the driving force of the engine 2 or the motor MG.

In this state, the secondary pressure $P_{SEC}$ serves as a lubricating pressure and the lubricating oil that flows based on the lubricating pressure is supplied to the second lubrication circuit 82, the third lubrication circuit 83, and the fourth lubrication circuit 84 through the cooler 70 as described above. Since the spool 44*p* of the first lubrication switch valve 44 is switched to the lower position in the figure, the oil pressure $P_{EOP}$ of the electric oil pump 22 that is input to the input port 44*c* is output from the output port 44*d* to the oil passage e2 and supplied to the first lubrication circuit 81 via the oil passage c13. As a result, the oil pressure $P_{EOP}$ of the electric oil pump 22 that had been supplied to the oil passage a6 and also supplied to the second to fourth lubrication circuits 82 to 84 etc. via the engagement circuit 47 (clutches etc.) and the secondary regulator valve 43 is directly supplied to the first lubrication circuit 81. In other words, the oil pressure $P_{EOP}$ higher than the secondary pressure $P_{SEC}$ serves as a lubricating pressure and the lubricating oil is supplied to the first lubrication circuit 81 at a flow rate (second flow rate) higher than a flow rate (first flow rate) when a lubricating pressure is supplied to the first lubrication circuit 81 based on the secondary pressure $P_{SEC}$. That is, the high-flow rate state is achieved in which the flow rate of the lubricating oil that is supplied to the starting clutch WSC is high. The starting clutch WSC that is slip-engaged and generates a large amount of heat when the vehicle starts to move can therefore be sufficiently lubricated (cooled).

Since the oil pressure $P_{EOP}$ of the electric oil pump 22 is higher than the secondary pressure $P_{SEC}$, the check ball 54 does not open, and the lubricating oil is supplied to the first lubrication circuit 81 by the oil pressure $P_{EOP}$ of the electric oil pump 22 independently of the supply of the lubricating oil to the second lubrication circuit 82 to the fourth lubrication circuit 84.

When the slip engagement of the starting clutch WSC is finished and the starting clutch WSC is switched to the engaged state, the control device 31 controls the solenoid valve SRL1 to be OFF to return the spool 44*p* of the first lubrication switch valve 44 to the upper position in the figure. As a result, the lubricating oil is supplied to the first lubrication circuit 81 to the fourth lubrication circuit 84 via the cooler 70, and the oil pressure $P_{EOP}$ of the electric oil pump 22 is used as a source pressure for the line pressure PL and the secondary pressure $P_{SEC}$.

As described above, in the hybrid drive device 1 according to the present embodiment, the lubricating oil can be supplied to the starting clutch WSC through the cooler 70 via the oil passages c7 to c13 by switching the second lubrication switch valve 45 to the upper position in the figure (disconnected state). The lubricating oil can also be supplied to the starting clutch WSC via the oil passages c6, e1, and e2 while bypassing the cooler 70 by switching the second lubrication switch valve 45 to the lower position in the figure (communicating state). Insufficient supply of the lubricating oil can thus be prevented. The hydraulic control device 40 can be switched between the first state in which the oil pressure $P_{EOP}$ generated by the electric oil pump 22 is used as the line pressure PL and the second state in which the oil pressure $P_{MOP}$ generated by the mechanical oil pump 21 is used as the line pressure PL and the oil pressure generated by the electric oil pump 22 is used to lubricate the starting clutch WSC.

Figure 5:
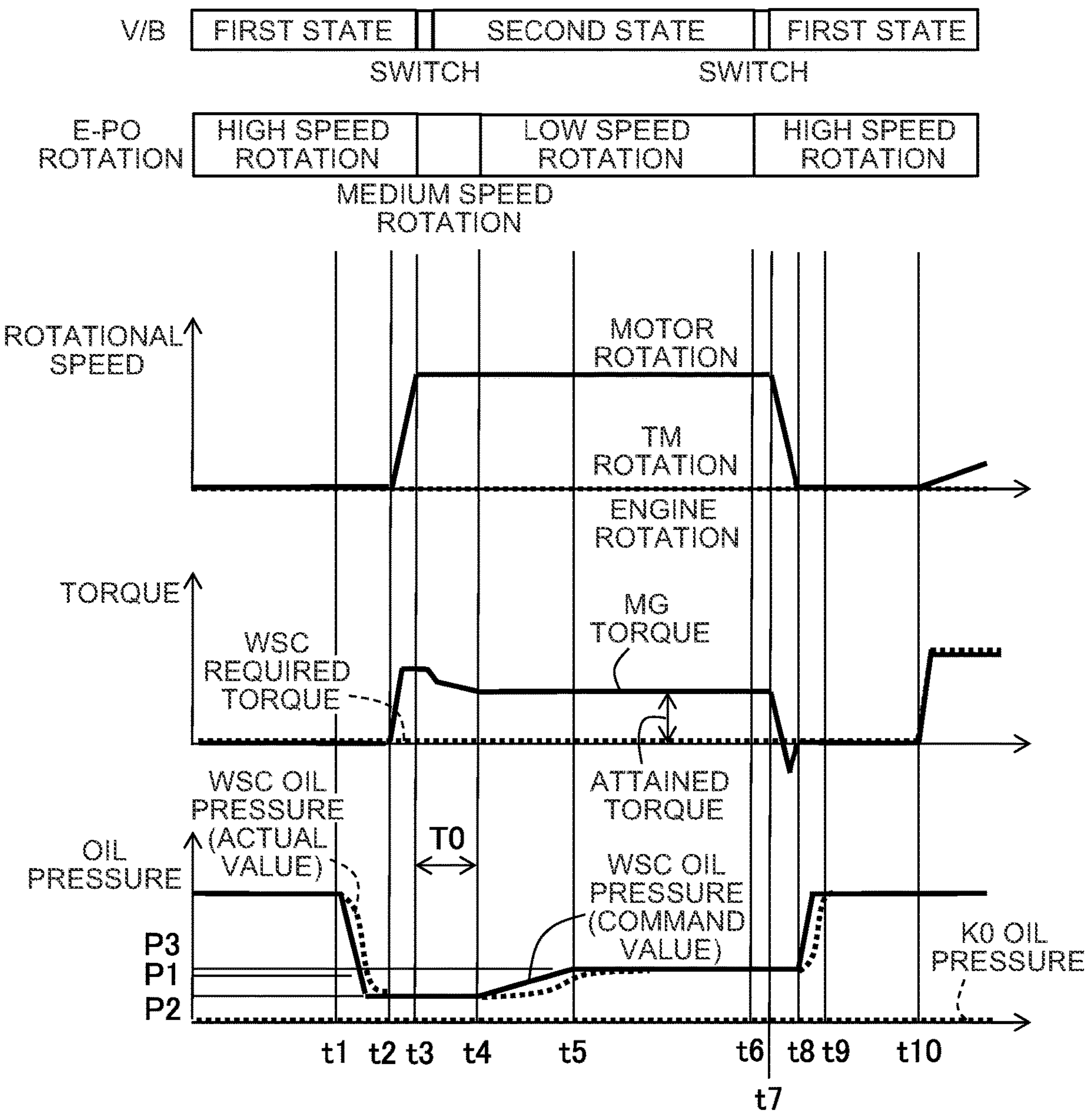
FIG. 5 is a timing chart showing the procedure of learning control in the vehicle drive device according to the embodiment.
Figure 6:
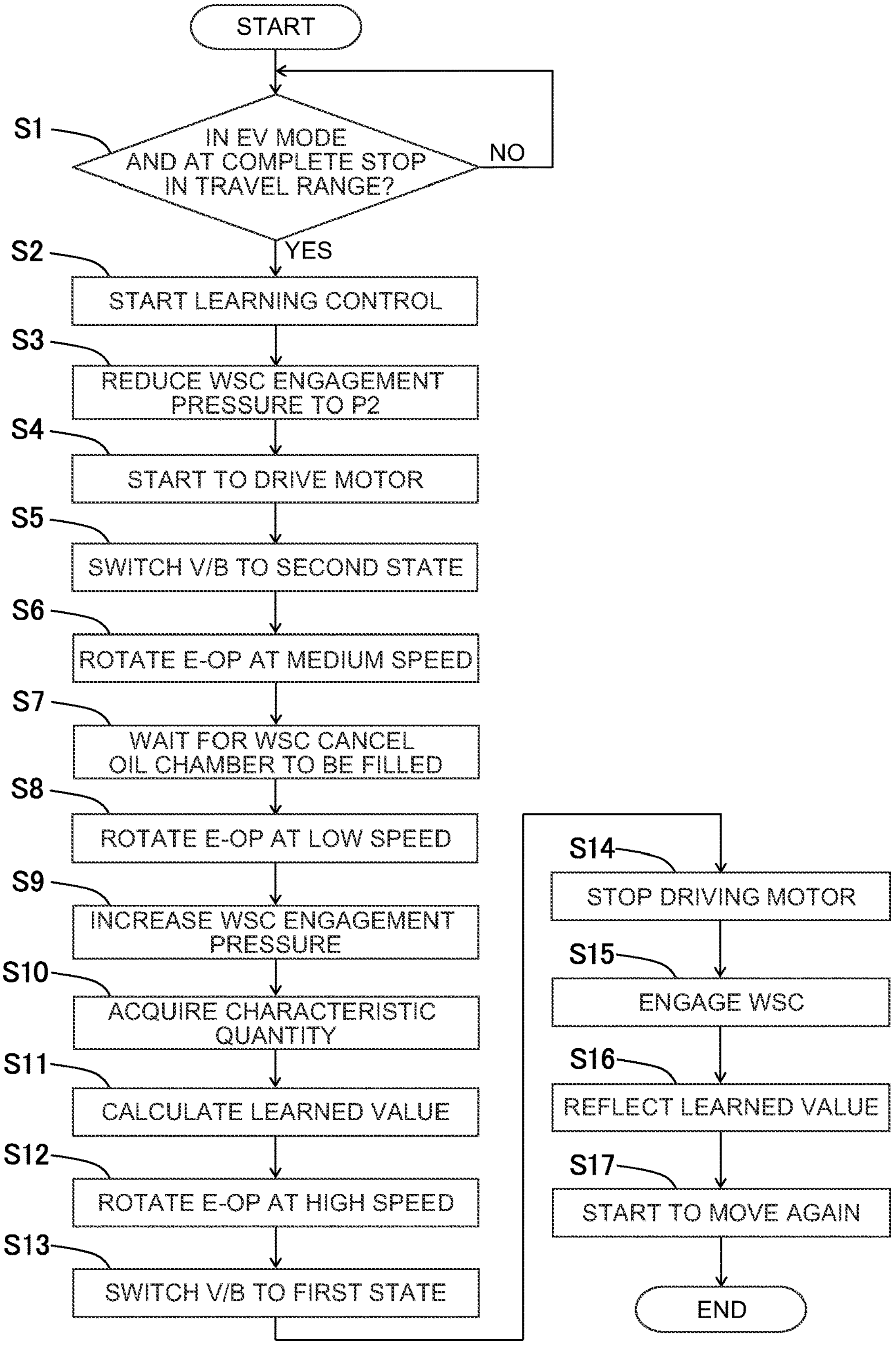
FIG. 6 is a flowchart showing the procedure of the learning control in the vehicle drive device according to the embodiment.

Next, the procedure of learning control of the engagement start pressure of the starting clutch WSC that is performed by the hybrid drive device 1 will be described in detail with reference to the timing chart shown in FIG. 5 and the flowchart shown in FIG. 6.

The control device 31 determines whether the vehicle is at a complete stop in EV mode and the speed change mechanism 5 is in the travel range (D range or R range) (step S1). For example, one forward speed is formed in D range. When the control device 31 determines that the vehicle is not at a complete stop in EV mode and the speed change mechanism 5 is not in the travel range (NO in step S1), the control device 31 makes the determination again (step S1). When the control device 31 determines that the vehicle is at a complete stop in EV mode and the speed change mechanism 5 is in the travel range (YES in step S1), the control device 31 starts learning control of the engagement start pressure of the starting clutch WSC when other conditions are satisfied (t1, step S2). Since the speed change mechanism 5 is in the travel range, a power transmission path from the input shaft 5*a* to the output shaft 5*b* is formed in the speed change mechanism 5. Therefore, since the vehicle is at a complete stop and the speed change mechanism 5 is in the travel range, the input shaft 5*a* of the speed change mechanism 5 is held stationary and non-rotatable.

For example, the above other conditions include that the driver is depressing a brake pedal and a brake device for stopping the vehicle is in an activated state, that a timer has detected that a predetermined time (e.g., several seconds) has elapsed since the vehicle came to a complete stop, and that the vehicle has traveled a predetermined distance (e.g., several thousands of kilometers) since the previous learning control. The condition that the predetermined time has elapsed since the vehicle came to a complete stop is included for the following reason. The vehicle may start to move again immediately after it comes to a complete stop. Therefore, if the learning control is started immediately after the vehicle comes to a complete stop, the vehicle may become less responsive when starting to move again. This condition is therefore included in order to prevent the vehicle from becoming less responsive when starting to move again immediately after it comes to a complete stop. In addition, performing the learning control more often than necessary decreases the fuel efficiency. Therefore, the learning control is set to be performed every several thousands of kilometers. However, it should be understood that the above other conditions are not limited to those described above.

The learning control of the engagement start pressure of the starting clutch WSC is generally control in which the motor MG is driven while controlling the engagement pressure to the engagement start pressure at which the friction plates 91 of the starting clutch WSC start to engage and the engagement start pressure is learned based on a change in driving state of the motor MG at the time the friction plates 91 start to engage. Accordingly, in the present embodiment, the control device 31 performs the learning control when the input shaft 5*a* of the speed change mechanism 5 is held stationary and non-rotatable. Even when the vehicle is at a complete stop, the input shaft 5*a* is not held stationary and non-rotatable if the speed change mechanism 5 is in, for example P range or N range. The input shaft 5*a* therefore may rotate due to drag if an attempt is made during the learning control to engage the starting clutch WSC with the motor MG being rotated. It may not be possible to learn the engagement start pressure of the starting clutch WSC if the input shaft 5*a* rotates due to drag. In this regard, in the present embodiment, the control device 31 performs the learning control when the input shaft 5*a* is held stationary and non-rotatable. This can prevent the input shaft 5*a* from rotating due to drag, making it possible to learn the engagement start pressure of the starting clutch WSC.

In the present embodiment, the control device 31 sequentially performs a preparation phase and a learning phase when it performs the learning control with the starting clutch WSC engaged. The preparation phase is a phase of adjusting the engagement pressure to an oil pressure P2 that is lower than an engagement start pressure P1 learned in the previous learning control by a predetermined value. The learning phase is a phase of learning an engagement start pressure P3 by gradually increasing the engagement pressure to start engaging the starting clutch WSC.

The learning control of the engagement start pressure of the starting clutch WSC will be described in detail below. When the learning control is started, the hydraulic control device 40 is in the first state in which the oil pressure $P_{EOP}$ generated by the electric oil pump 22 is used as the line pressure PL, and the electric oil pump 22 is rotating at high speed. Once the learning control is started (t1, step S2), the control device 31 adjusts, as the preparation phase of the learning control, the engagement pressure of the starting clutch WSC down to the oil pressure P2 that is lower than the engagement start pressure P1 learned in the previous learning control by the predetermined value (t2, step S3). The starting clutch WSC is thus switched to the disengaged state. In this example, the engagement pressure of the starting clutch WSC is reduced to a pressure that is lower than the engagement start pressure P1 by an amount corresponding to a piston hysteresis described later.

When the engagement pressure is reduced to the oil pressure P2, the control device 31 starts to drive the motor MG (t2, step S4). The rotational speed and torque increase as the driving of the motor MG is started. In this example, the control device 31 performs the learning control by the rotational speed control by acquiring displacement of the motor torque while keeping the rotational speed of the motor MG constant. At this time, the required torque of the starting clutch WSC (WSC required torque) is kept at 0 (until t10). The control device 31 starts to drive the motor MG after the torque capacity of the starting clutch WSC becomes equal to or less than a predetermined value at which creep does not occur.

When the rotational speed of the motor MG reaches a desired constant speed (t3), the control device 31 switches the hydraulic control device 40 from the first state to the second state in which the oil pressure $P_{MOP}$ generated by the mechanical oil pump 21 is used as the line pressure PL and the oil pressure generated by the electric oil pump 22 is used to lubricate the starting clutch WSC (step S5). The control device 31 sets the rotational speed of the electric oil pump 22 to medium speed to reduce the discharge amount (step S6). Moreover, the control device 31 waits while keeping driving the motor MG (t3 to t4, step S7). That is, the control device 31 has a wait time TO for the cancel oil chamber 97 to be filled with oil before performing the learning phase. The cancel oil chamber 97 rotates with the rotating shaft 1B of the motor MG. Therefore, when the motor MG stops while the vehicle is at a complete stop, oil flows out of the cancel oil chamber 97. Accordingly, a filling time is provided on the assumption that oil has flown out of the cancel oil chamber 97. Particularly in the present embodiment, one condition to start the learning control is that the predetermined time has elapsed since the vehicle came to a complete stop. Therefore, it is highly likely that oil has flown out of the cancel oil chamber 97 during the predetermined time.

After the wait time TO has elapsed, the control device 31 sets the rotational speed of the electric oil pump 22 to low speed to further reduce the discharge amount (step S8). The control device 31 gradually increases the engagement pressure of the starting clutch WSC to the current engagement start pressure (t4 to t5, step S9). When the engagement pressure is reduced from a full engagement pressure to near the engagement start pressure, the piston member 93 of the hydraulic servo 90 may not be able to reach the position the piston member 93 is supposed to reach due to the hysteresis in the stroke of the piston member 93. In this case, even if the engagement pressure is increased from that position, the piston member 93 may not move by the amount corresponding to the hysteresis, and the engagement state of the friction plates 91 may not change. In this regard, in the present embodiment, the engagement value is first reduced to the oil pressure P2 that is lower than the engagement start pressure P1 by the predetermined value such as by the amount corresponding to the piston hysteresis, and is increased from this oil pressure P2 to the current engagement start pressure. This can reduce the influence of the piston hysteresis, and can improve the accuracy of the final learned value.

The control device 31 acquires the relationship among the motor torque, the motor rotational speed, and the engagement pressure of the starting clutch WSC as a characteristic quantity (t5 to t6, step S10). When the control device 31 determines to end the learning control (t6), the control device 31 calculates a learned value based on the acquired characteristic value (step S11). Although detailed description of a method for calculating the learned value will be omitted, the learned value is calculated based on whether the motor torque (attained torque) is larger or smaller a design value of drag torque. In general, it is determined based on displacement of the motor torque that the starting clutch WSC starts to engage, and the engagement pressure at that time is acquired as a new engagement start pressure P3.

In the engagement start pressure region of the starting clutch WSC, the torque sensitivity to the oil pressure may decrease as the lubrication flow rate of the starting clutch WSC increases. The reason for this is as follows. When there is lubricating oil between the friction plates 91, drag torque is generated. When the lubrication flow rate increases in this case, the torque capacity near the engagement start pressure becomes substantially equal to the torque capacity due to the drag in the fully disengaged state. Therefore, it may become impossible to correctly determine whether the starting clutch WSC is in a state near the state in which the starting clutch WSC starts to engage. In the hydraulic control device used in the present embodiment, the amount of lubricating oil in the starting clutch WSC can be increased to high lubrication by switching the hydraulic control device 40 to the second state when the vehicle starts to move normally. On the other hand, in the present embodiment, when learning the engagement start pressure, the hydraulic control device 40 is switched to the second state and the rotational speed of the electric oil pump 22 is set to low speed to significantly reduce the discharge amount compared to when the vehicle starts to move normally. That is, when engaging the starting clutch WSC at the time the vehicle starts to move, the control device 31 switches the hydraulic control device 40 to the second state to set the discharge amount of the electric oil pump 22 to a first discharge amount. When learning the engagement start pressure by the learning control, the control device 31 switches the hydraulic control device 40 to the second state to set the discharge amount of the electric oil pump 22 to a second discharge amount smaller than the first discharge amount. The torque sensitivity to the oil pressure is therefore less likely to decrease in the engagement start pressure region of the starting clutch WSC, so that the learned value can be acquired with high accuracy.

Thereafter, the control device 31 sets the rotational speed of the electric oil pump 22 to high speed to increase the discharge amount (t6, step S12), switches the hydraulic control device 40 from the second state to the first state in which the oil pressure $P_{EOP}$ generated by the electric oil pump 22 is used as the line pressure PL (t7, step S13), and reduces the rotational speed of the motor MG to stop the motor MG (t7 to t8, step S14). The control device 31 also engages the starting clutch WSC (t8, step S15), and after the engagement, reflects the learned value (t9, step S16). The learning control refers to the control from step S2 to step S16. Subsequently, in response to depression of an accelerator pedal by the driver, the control device 31 starts to drive the motor MG so that the vehicle starts to move again (t10, step S17).

As described above, according to the hybrid drive device 1 of the present embodiment, the control device 31 performs the learning control when the input shaft 5*a* of the speed change mechanism 5 is held stationary and non-rotatable. Since the input shaft 5*a* is not rotatable unlike when the speed change mechanism 5 is in, for example, P range or N range, the input shaft 5*a* can be prevented from rotating due to drag, so that the engagement start pressure of the starting clutch WSC can be learned with high accuracy.

According to the hybrid drive device 1 of the present embodiment, when learning the engagement start pressure, the hydraulic control device 40 is switched to the second state and the rotational speed of the electric oil pump 22 is set to low speed to significantly reduce the discharge amount compared to when the vehicle starts to move normally. The torque sensitivity to the oil pressure is therefore less likely to decrease in the engagement start pressure region of the starting clutch WSC, so that the learned value can be acquired with high accuracy.

Summary of Embodiment

A vehicle drive device (1) includes:

a rotating electrical machine (MG);

a speed change mechanism (5) including an input member (5*a*) and an output member (5*b*) drivingly connected to wheels (9), and configured to change a speed ratio between the input member (5*a*) and the output member (5*b*);

a friction engagement device (WSC) interposed between the rotating electrical machine (MG) and the input member (5*a*) and including a friction engagement element (91) configured to connect and disconnect power transmission between the rotating electrical machine (MG) and the input member (5*a*) as an engagement pressure is supplied and discharged; and a control device (31) that controls the rotating electrical machine (MG) and the friction engagement device (WSC).

The control device (31) performs learning control when the input member (5*a*) is held stationary and non-rotatable, the learning control being control in which the control device (31) drives the rotating electrical machine (MG) while controlling the engagement pressure to an engagement start pressure at which the friction engagement element (91) starts to engage, and learns the engagement start pressure based on a change in driving state of the rotating electrical machine (MG) at the time the friction engagement element (91) starts to engage.

Since the input member (5*a*) is not rotatable unlike when the speed change mechanism (5) is in, for example, P range or N range, the input member (5*a*) can be prevented from rotating due to drag, so that the engagement start pressure of the friction engagement element (91) can be learned with high accuracy.

In the vehicle drive device (1), the input member (5*a*) being held stationary and non-rotatable is a state in which a power transmission path from the input member (5*a*) to the output member (5*b*) is formed in the speed change mechanism (5) and a vehicle is at a complete stop.

Since the vehicle is at a complete stop and the speed change mechanism (5) is in a travel range, the input member (5*a*) of the speed change mechanism (5) is held stationary and non-rotatable. In such a state, the engagement start pressure of the friction engagement element (91) can be learned with high accuracy.

In the vehicle drive device (1), the friction engagement device (WSC) includes a hydraulic servo (90), the hydraulic servo (90) including a cylinder member (92) and a piston member (93) located so as to be axially movable with respect to the cylinder member (92), forming a hydraulic oil chamber (96) between the piston member (93) and the cylinder member (92), and configured to push the friction engagement element (91) by an oil pressure supplied to the hydraulic oil chamber (96), and the control device (31) performs, when performing the learning control from a state in which the friction engagement element (91) is in an engaged state, a preparation phase of adjusting the engagement pressure to a pressure lower than the learned engagement start pressure by a predetermined value, and a learning phase of learning the engagement start pressure by gradually increasing the engagement pressure to start engaging the friction engagement element (91).

Since the preparation phase is provided and the engagement pressure is adjusted to a pressure lower than the learned engagement start pressure by the predetermined value, the engagement start pressure can be learned with higher accuracy in the learning phase.

In the vehicle drive device (1), the hydraulic servo (90) includes an opposing member (94) located on one side in an axial direction with respect to the piston member (93) so as to face the piston member (93) and forming an opposing oil chamber (97) that cancels a centrifugal oil pressure generated in the hydraulic oil chamber (96), and the control device (31) has a wait time (TO) for the opposing oil chamber (97) to be filled with oil before performing the learning phase.

When the rotating electrical machine (MG) stops while the vehicle is at a complete stop, oil flows out of the opposing oil chamber (97). Therefore, by filling the opposing oil chamber (97) with oil during the wait time (TO), the engagement start pressure can be learned with higher accuracy in the learning phase.

The vehicle drive device (1) further includes:

a mechanical oil pump (21) that is driven by the rotating electrical machine (MG);

an electric oil pump (22) configured to be driven independently of the mechanical oil pump (21); and a hydraulic control device (40) configured to be switched between a first state in which an oil pressure generated by the electric oil pump (22) is used as a line pressure and a second state in which an oil pressure generated by the mechanical oil pump (21) is used as the line pressure and the oil pressure generated by the electric oil pump (22) is used to lubricate the friction engagement element (91).

When engaging the friction engagement element (91) at a time a vehicle starts to move, the control device (31) switches the hydraulic control device (40) to the second state and sets a discharge amount of the electric oil pump (22) to a first discharge amount.

When learning the engagement start pressure by the learning control, the control device (31) switches the hydraulic control device (40) to the second state and sets the discharge amount of the electric oil pump (22) to a second discharge amount smaller than the first discharge amount.

The torque sensitivity to the oil pressure is therefore less likely to decrease in the engagement start pressure region of the friction engagement element (91), so that a learned value can be acquired with high accuracy.

In the hybrid drive device 1 of the present embodiment described above, the description is given of the case where the starting clutch WSC is a wet friction engagement device. However, the starting clutch WSC is not limited to this and may be applied to a dry friction engagement device.

In the hybrid drive device 1 of the present embodiment, the description is given of the case where the control device 31 performs the learning control while controlling the motor MG by the rotational speed control. However, the present disclosure is not limited to this, and the control device 31 may perform the learning control while controlling the motor MG by torque control. In this case, since the motor MG is controlled by the torque control, it is possible to perform the learning by detecting a change in rotation that occurs at the time the engagement starts.

In the hybrid drive device 1 of the present embodiment, the description is given of the case where the vehicle drive device is applied to a hybrid drive device. However, the present disclosure is not limited to this, and the vehicle drive device may be applied to an EV vehicle without an engine and a clutch K0.

INDUSTRIAL APPLICABILITY

The vehicle drive device according to the present disclosure is applicable to vehicle drive devices that are mounted on vehicles such as automobiles and that include a rotating electrical machine, a speed change mechanism, and a friction engagement device.

DESCRIPTION OF THE REFERENCE NUMERALS

1 . . . hybrid drive device (vehicle drive device), 5 . . . speed change mechanism, **5*a* . . . input shaft (input member), 5*b* . . . output shaft (output member), 9 . . . wheel, 21 . . . mechanical oil pump, 22 . . . electric oil pump, 31 . . . control device, 40 . . . hydraulic control device, 90 . . . hydraulic servo, 91 . . . friction plate (friction engagement element), 92 . . . cylinder member, 93 . . . piston member, 94 . . . return plate (opposing member), 96 . . . hydraulic oil chamber, 97 . . . cancel oil chamber (opposing oil chamber), MG . . . motor generator (rotating electrical machine), T0** . . . wait time, WSC . . . starting clutch (friction engagement device)

The invention claimed is:

1. A vehicle drive device comprising:

a rotating electrical machine;

a transmission including an input member and an output member drivingly connected to wheels, and configured to change a speed ratio between the input member and the output member;

a clutch interposed between the rotating electrical machine and the input member and including a friction engagement element configured to connect and disconnect power transmission between the rotating electrical machine and the input member as an engagement pressure is supplied and discharged, the friction engagement device including a hydraulic servo, the hydraulic servo including a cylinder member and a piston member so as to be axially movable with respect to the cylinder member, forming a hydraulic oil chamber between the piston member and the cylinder member, and configured to push the friction engagement element by an oil pressure supplied to the hydraulic oil chamber; and a controller that controls the rotating electrical machine and the clutch, wherein the controller performs learning control when the input member is held stationary and non-rotatable, the learning control being control in which the controller drives the rotating electrical machine while controlling the engagement pressure to increase to an engagement start pressure at which the friction engagement element starts to engage, and learns the engagement start pressure based on a change in driving state of the rotating electrical machine at a time the friction engagement element starts to engage, wherein the engagement start pressure is defined as the engagement pressure at which the piston member strokes from a disengaged state to a stroke end where the piston member comes into contact with the friction engagement element.

2. The vehicle drive device according to claim 1, wherein the input member being held stationary and non-rotatable is a state in which a power transmission path from the input member to the output member is formed in the transmission and a vehicle is at a complete stop.

3. The vehicle drive device according to claim 1, wherein the controller performs, when performing the learning control from a state in which the friction engagement element is in an engaged state, a preparation phase of adjusting the engagement pressure to a pressure lower than a prior learned engagement start pressure determined prior to the learning control by a predetermined value, and a learning phase of learning the engagement start pressure by gradually increasing the engagement pressure to start engaging the friction engagement element.

4. The vehicle drive device according to claim 3, wherein the hydraulic servo includes an opposing member located on one side in an axial direction with respect to the piston member so as to face the piston member and forming an opposing oil chamber that cancels a centrifugal oil pressure generated in the hydraulic oil chamber, and the controller has a wait time for the opposing oil chamber to be filled with oil before performing the learning phase.

5. The vehicle drive device according to claim 1, further comprising:

a mechanical oil pump that is driven by the rotating electrical machine;

an electric oil pump configured to be driven independently of the mechanical oil pump; and a hydraulic controller configured to be switched between a first state in which an oil pressure generated by the electric oil pump is used as a line pressure and a second state in which an oil pressure generated by the mechanical oil pump is used as the line pressure and the oil pressure generated by the electric oil pump is used to lubricate the friction engagement element, wherein when engaging the friction engagement element at a time a vehicle starts to move, the controller switches the hydraulic controller to the second state and sets a discharge amount of the electric oil pump to a first discharge amount, and when learning the engagement start pressure by the learning control, the controller switches the hydraulic controller to the second state and sets the discharge amount of the electric oil pump to a second discharge amount smaller than the first discharge amount.

* * * * *